United States Patent [19]
Shibuya

[11] Patent Number: 5,832,427
[45] Date of Patent: Nov. 3, 1998

[54] AUDIO SIGNAL SIGNAL-TO-MASK RATIO PROCESSOR FOR SUBBAND CODING

[75] Inventor: Yoshitaka Shibuya, Tokyo, Japan

[73] Assignee: NEC Corporation, Tokyo, Japan

[21] Appl. No.: 656,476

[22] Filed: May 31, 1996

[30] Foreign Application Priority Data

May 31, 1995 [JP] Japan .................................... 7-133676

[51] Int. Cl.$^6$ ...................................................... G10L 7/02
[52] U.S. Cl. .......................................... 704/230; 704/205
[58] Field of Search ................................. 395/2.12, 2.14, 395/2.2, 2.38, 2.39; 704/203, 205, 211, 229, 230

[56] References Cited

U.S. PATENT DOCUMENTS

| | | | |
|---|---|---|---|
| 5,394,473 | 2/1995 | Davidson | 395/2.2 |
| 5,508,949 | 4/1996 | Konstantinides | 364/725.03 |
| 5,588,024 | 12/1996 | Takano | 375/242 |
| 5,625,743 | 4/1997 | Fiocca | 395/2.14 |

OTHER PUBLICATIONS

Peter Noll, "MPEG Digital Audio Coding", IEEE Signal Processing Magazine, pp. 59–81, Sep. 1987.
*Information technology—Coding of moving pictures and associated audio for digital storage media at up to about 1,5 Mbit/s*; ISO/IEC 11172–3: 1993, pp. 109–115.

*Primary Examiner*—David R. Hudspeth
*Assistant Examiner*—Tálivaldis Ivars Šmits
*Attorney, Agent, or Firm*—Foley & Lardner

[57] ABSTRACT

In an audio signal processing circuit for carrying out a subband coding used for an audio signal coding, a subband filter (12A) receives 1152 audio samples (SI) of each one frame and divides the samples into 32 frequency bands to sequentially output a vector of first half subband signals (SFA) for a first half of the one frame and a vector of second half subband signals (SFB) for a second half of the one frame. A FFT circuit (111A) carries out an FFT processing for 512 audio samples of each of the first half and the second half of each one frame, to sequentially generate a first half power spectrum (PSA) and a second half power spectrum (PSB). A calculating circuit (113A) calculates a first half SMR vector (SMA) on the basis of the first half subband signals (SFA) and the first half power spectrum (PSA), and then, a second half SMR vector (SMB) on the basis of the second half subband signals (SFB) and the second half power spectrum (PSB). A comparing circuit (115) outputs a larger one of the first half SMR vector (SMA) and the second half SMR vector (SMB), as an SMR vector (SM) for the whole of a corresponding one frame.

2 Claims, 4 Drawing Sheets

AUDIO SIGNAL SIGNAL-TO-MASK RATIO PROCESSOR FOR SUBBAND CODING

BACKGROUND OF THE INVENTION

1. Field of the Invention

The present invention relates to an audio signal processing circuit, and more specifically to an audio signal processing circuit for carrying out a subband coding used for an audio signal coding based on the MPEG audio standard.

2. Description of Related Art

As a system for coding an audio signal such as that included in a television signal, and as a technology for transmitting or storing audio data by reducing the information amount of audio signals on the basis of the subband coding, there has been known an MPEG audio standard prescribed in the Recommendations ISO/IEC-11172-3 (1993) which was discussed for standardization in ISO/IEC and JTC1/SC2/WG8 and is one of draft standards proposed by the MPEG (Moving Picture Expert Group).

Referring to FIG. 1, there is shown a block diagram showing a subband coding circuit used for coding based on the MPEG audio standard. The shown subband coding circuit comprises an audio signal processing circuit 1 including an SMR calculating circuit 11 receiving input audio samples SI (quantized in a predetermined format), for calculating a signal-to-mask ratio (simply abbreviated to a "SMR" hereinafter) which is a ratio of a signal level to a mask level, the SMR calculating circuit 11 outputting a vector of SMR signals SM, and a subband filter 12 receiving the input audio samples SI, for carrying out a subband filtering to the received input audio samples SI, and outputting the result of the subband filtering as a vector of subband signals SF. The shown subband coding circuit also comprises a bit allocating/quantizing circuit 2 receiving the SMR signals SM and the subband signals SF, for determining a bit allocation of each subband signal SF on the basis of the value of a corresponding SMR signal SM, and for further conducting a quantization so as to output a quantized data SD, and a bit stream configuring circuit 3 receiving the quantized data SD, for configuring and outputting a bit stream data BS.

Next, an operation of the subband coding circuit will be described with reference to FIG. 1, again.

The subband filter 12 of the audio signal processing circuit 1 carries out the subband filtering to the input audio samples SI, and sequentially generates a vector of subband signals SF. The SMR calculating circuit 11 calculates the SMR for each of subbands on the basis of the input audio samples SI, and outputs a vector of SMR signals SM. Here, ears of a human being are insensitive to a sound of a level lower than a critical sound level. The mask level used for the calculation of the SMR means this critical sound level. However, this critical sound level varies dependently upon the frequency distribution of a sound which is listened by the ears of a human being.

Depending upon the value of each SMR signal SM, the bit allocating/quantizing circuit 2 determines the bit allocation for each subband signal SF by allocating a large number of bits when the value of the SMR signal SM is large and a small number of bits when the value of the SMR signal SM is small. With this processing, it is possible to reduce the bit number of a bit stream corresponding to the whole of an audio signal. Furthermore, on the basis of the bit allocation, the bit allocating/quantizing circuit 2 quantizes each subband signal SF to generate a quantized data QD.

The bit stream configuring circuit 3 configures the received quantized data SD to the bit stream data BS in a predetermined format.

The present invention is directed to the audio signal processing circuit 1 included in the subband coding circuit as mentioned above. Referring to FIG. 2, there is shown a block diagram of a conventional audio signal processing circuit.

This conventional audio signal processing circuit includes, in addition to the SMR calculating circuit 11 and the subband filter 12 as mentioned above, a control circuit 13 for controlling the operation of the audio signal processing circuit.

The SMR calculating circuit 11 includes a 1024-point FFT (Fast Fourier Transformation) circuit 111 for conducting a FFT processing to each one frame of input audio samples, to output a power spectrum PS, a buffer memory 112 coupled to the FFT circuit 111 and used a buffer for a calculation conducted in the FFT circuit 111, and a calculating circuit 113 for calculating the SMR on the basis of the power spectrum PS and the subband signals SF, to output the SMR signal SM.

Now, an operation of the conventional audio signal processing circuit as mentioned above will be described with reference to FIG. 2 again.

At each time the FFT circuit 111 has received 1152 input audio samples SI corresponding to one frame, the FFT circuit 111 conducts 1024-point FFT processing for 1024 samples of the received 1152 samples, and sequentially outputs the power spectrum PS of 512 samples, namely, 512 power spectrum signals PS indicative of the power at 512 different frequency points, respectively, to the calculating circuit 113. As mentioned above, in the course of the FFT processing of the FFT circuit 111, the buffer memory 112 is used as a buffer for the calculation conducted in the FFT circuit 111. Therefore, a required memory capacity of the buffer memory 112 corresponds to 1024 samples of complex data composed of a real number and an imaginary number, because the FFT is a 1024-point FFT.

The subband filter 12 receives the input audio samples SI sequentially supplied, and sequentially outputs the subband signals SF by dividing each 32 input audio samples SI into 32 frequency bands (namely, subbands). Therefore, the subband filter 12 receives the 1152 input audio samples SI of each one frame, and on the other hand, the subband filter 12 outputs the subband signals SF of 1152 samples, namely, 1152 subband signals SF for each one frame.

The calculating circuit 113 receives the 512 power spectrum signals PS and the 1152 subband signals SF, and calculates the SMR for each of the 32 frequency bands, to sequentially output a vector of SMR signals SM for each one frame.

Since the above mentioned audio signal processing circuit 1 is configured to carry out the 1024-point FFT processing directly to the 1024 samples of input audio data samples (namely, 1152 samples) of one frame, there is required a buffer memory capacity corresponding to 1024 samples of complex data. Specifically, assuming that the word length of the complex data is 24 bits, a required memory capacity of the buffer memory 112 is 24(bits)×1024(samples)×2(real number part and imaginary number part)=49152 bits. Therefore, the scale of hardware inevitably becomes large, which is a hindrance in constructing necessary hardware.

SUMMARY OF THE INVENTION

According, it is an object of the present invention to provide an audio signal processing circuit for use in a subband coding circuit, which has overcome the above mentioned defect of the conventional one.

Another object of the present invention is to provide an audio signal processing circuit for use in a subband coding circuit, which has a buffer memory having a reduced memory capacity so as to size down and cost down the audio signal processing circuit, and which can carry out an operation comparable to that of the conventional circuit.

The above and other objects of the present invention are achieved in accordance with the present invention by an audio signal processing circuit for carrying out a subband coding used for an audio signal coding, the audio signal processing circuit being so configured that each one frame is constituted of a first number of audio samples quantized in a predetermined format, and the audio samples of each one frame are converted into subband signals divided into a second number of frequency bands, the second number being smaller than the first number, and in each subband, a signal level is compared to a mask level indicative of a limit of "sense of hearing", so as to calculate a signal-to-mask ration (SMR), the audio signal processing circuit comprising:

a subband filter circuit receiving the audio samples, for generating the subband signals divided into the second number of frequency bands;

a fast Fourier transform circuit receiving the audio samples and dividing the received audio samples of each one frame into first and second audio sample groups each including a third number of audio samples, the third number being smaller than the first number, the fast Fourier transform circuit carrying out a fast Fourier transform processing for each of the first and second audio sample groups, group by group, so as to sequentially output a first power spectrum for the first audio sample group, and a second power spectrum for the second audio sample group;

a buffer memory coupled to the fast Fourier transform circuit and used as a buffer in the fast Fourier transform processing carried out in the fast Fourier transform circuit, the buffer memory having a memory capacity corresponding to the data amount of audio samples of the third number;

an SMR calculating circuit receiving the subband signals and the first and second vectors of values, power spectrums, for calculating first and second SMR each of which contains SMR signals corresponding to the frequency bands of the second number, respectively; and a comparing circuit for comparing each of the SMR vectors included in the first vectors of SMR values with a corresponding one of the SMR vectors included in the second vectors of SMR values, for each of the frequency bands of the second number, and for selecting a larger SMR to output the selected SMR as an SMR of the same frequency band for the whole of a corresponding one frame.

The above and other objects, features and advantages of the present invention will be apparent from the following description of preferred embodiments of the invention with reference to the accompanying drawings.

DESCRIPTION OF THE PREFERRED EMBODIMENTS

Figure 1:
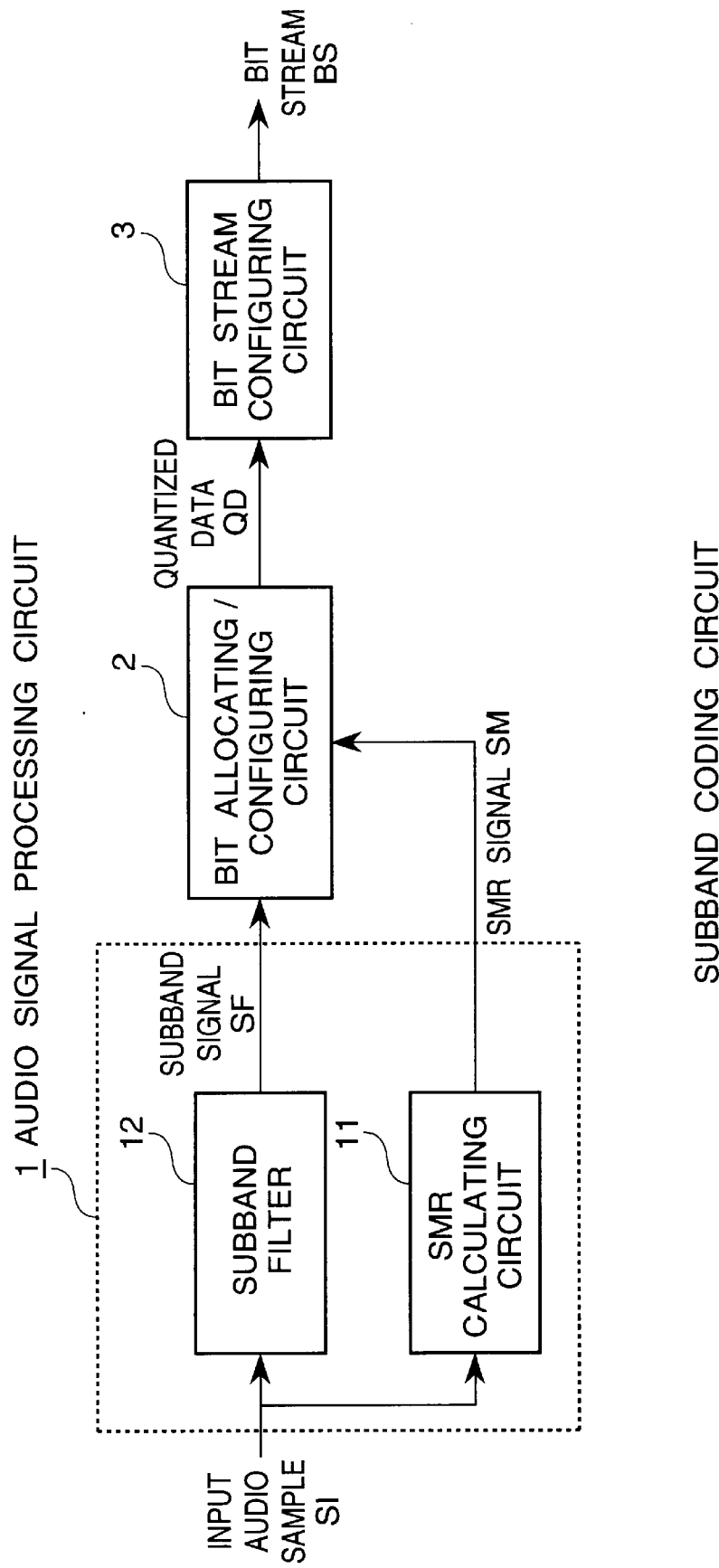
FIG. 1 is a block diagram showing a subband coding circuit used for coding based on the MPEG audio standards.
Figure 3:
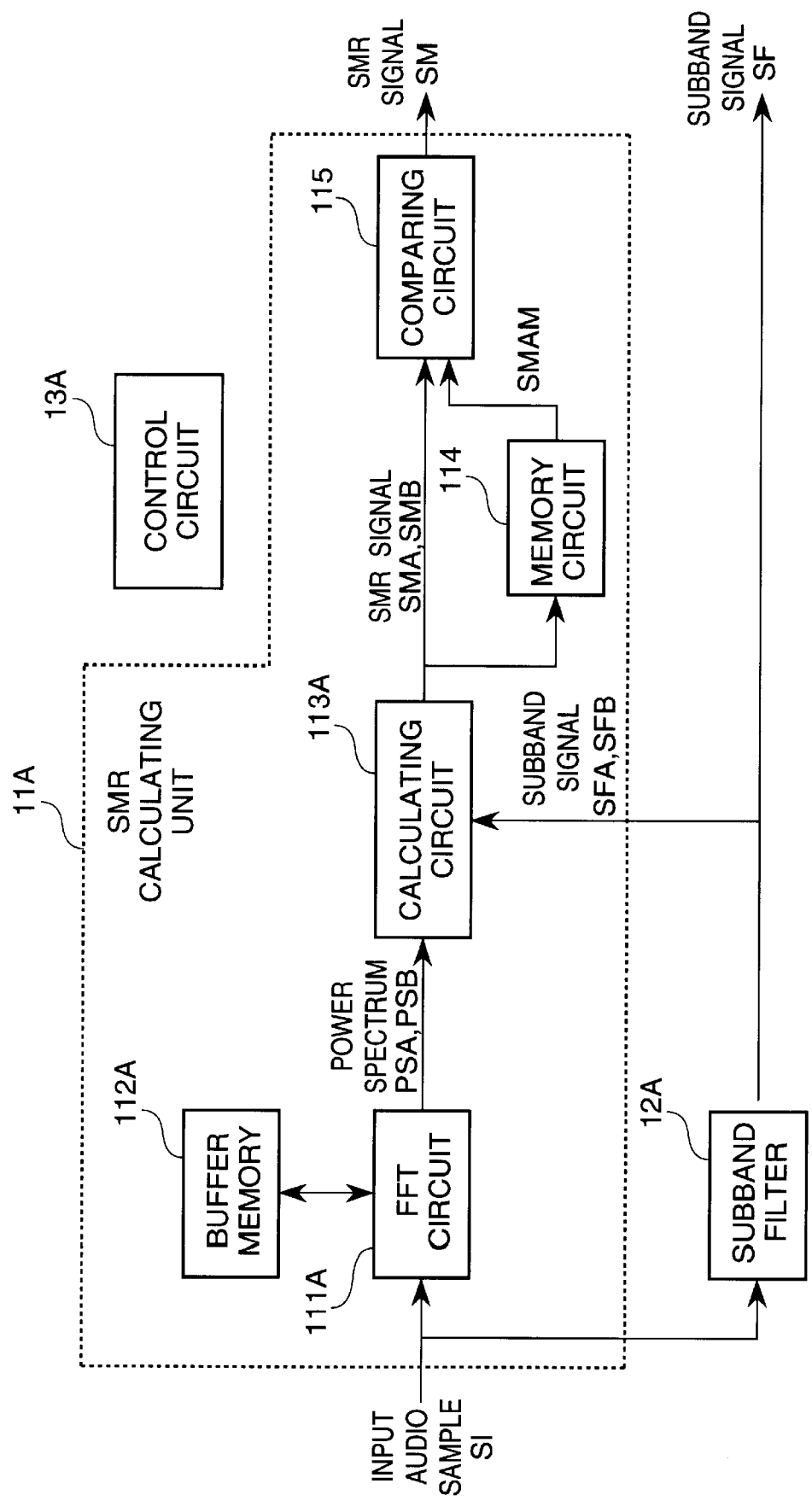
FIG. 3 is a block diagram of an embodiment of the audio signal processing circuit in accordance with the present invention, used in the subband coding circuit shown in FIG. 1.

Referring to FIG. 3, there is shown a block diagram of an embodiment of the audio signal processing circuit in accordance with the present invention, used in the subband coding circuit shown in FIG. 1.

Figure 2:
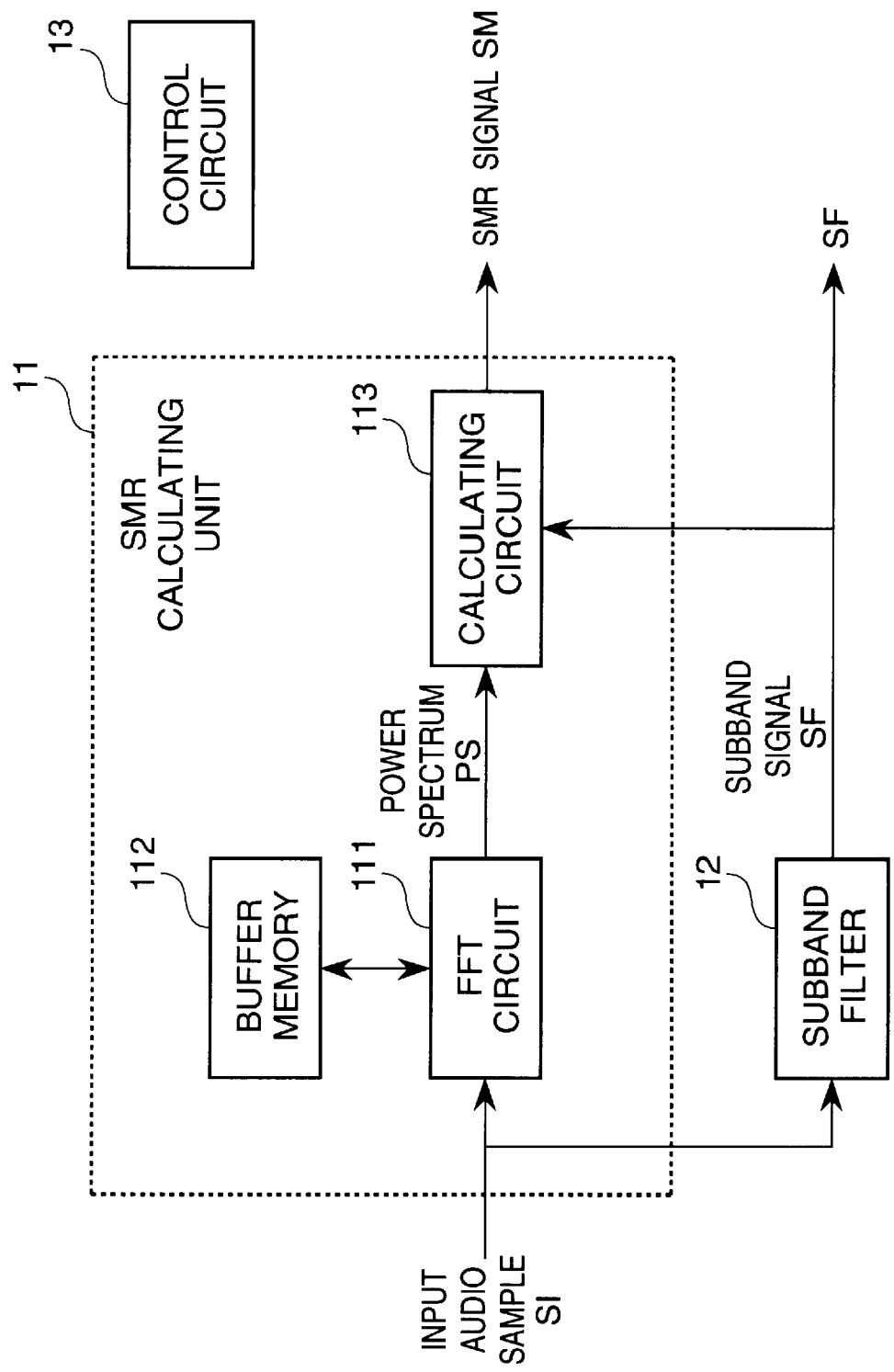
FIG. 2 is a block diagram of a conventional audio signal processing circuit used in the subband coding circuit shown in FIG. 1.

The audio signal processing circuit in accordance with the present invention is designated generally by Reference Number 1A, and includes an SMR calculating circuit 11A which is provided in place of the SMR circuit 11 of the conventional audio signal processing circuit 1 shown in FIG. 2. The SMR calculating circuit 11A is configured to sequentially carry out a 512-point FFT processing for each of a first half and a second half of each one frame of input audio samples, so as to generate a train of SMR vectors SM. The audio signal processing circuit 1A also includes a subband filter 12A for carrying out the subband filtering for 576 samples of each of a first half and a second half of input audio samples of each one frame, so as to sequentially generate a vector of subband signals SFA for the first half and a vector of subband signals SFB for the second half, by dividing each 32 input audio samples into 32 frequency bands. There is further provided a control circuit 13A for controlling the operation of the audio signal processing circuit 1A.

The SMR calculating circuit 11A comprises a 512-point FFT circuit 111A configured to conduct a 512-point FFT processing on 512 samples of 576 samples of each of a first half and a second half of input audio samples of each one frame, so as to sequentially generate power spectrums PSA and PAB, and a buffer memory 112A coupled to the FFT circuit 111A and used as a buffer for the calculation conducted in the FFT circuit 111A. The SMR calculating circuit 11A also comprises a calculating circuit 113A for calculating the SMR form the power spectrum PSA and the subband signals SFA for the first half of the one frame, so as to output a first vector of SMR values SMA for the first half of the one frame, and for calculating the SMR from the power spectrum PSB and the subband signals SFB for the second half of the one frame, so as to output a second vector of SMR values SMB for the second half of the one frame. The SMR calculating 11A furthermore comprises a memory circuit 114 for temporarily storing the first vector of SMR values SMA for the first half of the one frame, and outputting the stored first vector of SMR values SMA when the second vector of SMR values SMB for the second half of the one frame is outputted from the calculating circuit 113A, and a comparing circuit 115 receiving and comparing the second vector of SMR values SMB for the second half of the one frame, with the stored first vector of SMR values SMA for the first half of the one frame, so as to select and output a larger one.

Figure 4:
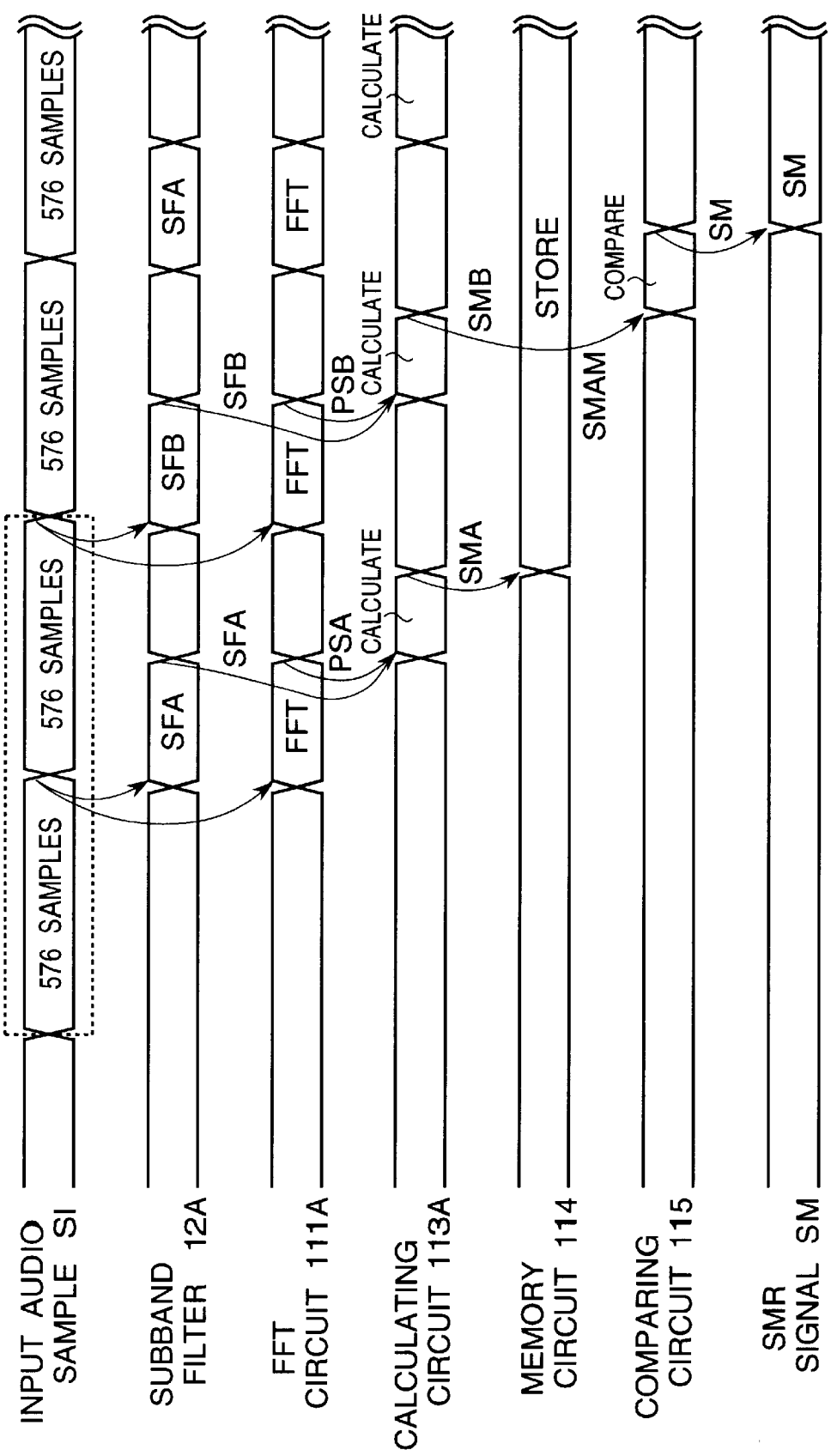
FIG. 4 is a timing chart illustrating an operation of the audio signal processing circuit shown in FIG. 3.

Now, operation of the audio signal processing circuit 1A will be described with reference to FIG. 4, which is a timing chart illustrating an operation of the audio signal processing circuit 1A.

At each time that the first half (576 samples) of 1152 input audio samples SI of each one frame have been received by the FFT circuit 111A, the FFT circuit 111A conducts the 512-point FFT processing for 512 samples of the 576 samples, and outputs to the calculating circuit 113A the first half power spectrum signals PSA of 256 samples (indicative of the power of 256 different frequency points, respectively). Thereafter, when the second half (576 samples) of the 1152 input audio samples SI of the same frame have been received by the FFT circuit 111A, the FFT circuit 111A further conducts the 512-point FFT processing for 512 samples of the 576 samples, and outputs to the calculating circuit 113A the second half power spectrum signals PSB of 256 samples (indicative of the power of 256 different frequency points, respectively). At this time, the buffer memory 112A is used as a buffer for the above mentioned 512-point FFT processing conducted in the FFT circuit 111A. Therefore, a required memory capacity of the buffer memory 112A corresponds to 512 samples of complex data composed of a real number and an imaginary number.

On the other hand, when the first half (576 samples) of 1152 samples input audio samples SI of each one frame have been received by the subband filter 12A, the subband filter 12A outputs to the calculating circuit 113A vector of 576 first half subband signals SFA divided into 32 frequency bands (subbands). Thereafter, when the second half (576 samples) of the 1152 input audio samples SI of the same frame have been received by the subband filter 12A, the subband filter 12A similarly outputs to the calculating circuit 113A a vector of 576 second half subband signals SFB divided into 32 frequency bands.

The calculating circuit 113 first calculates the SMR of each of the 32 frequency bands on the basis of the vector of 256 first half power spectrum signals PSA and the vector of 576 first half subband signals SFA, and generates a vector of 32 first half SMR values SMA for the 32 frequency bands, respectively. The memory circuit 114 receives the 32 first half SMR values SMA, and holds the received first half SMR values SMA until the second half SMR values SMB are similarly calculated and outputted. Then, the calculating circuit 113 calculates the SMR of each of the 32 frequency bands on the basis of the vector of 256 second half power spectrum PSB and the vector of 576 second half subband signals SFB, and generates a vector of 32 second half SMR values SMB for the 32 frequency bands, respectively.

The SMR comparing circuit 115 receives the second half SMR values SMB from the calculating circuit 113A and first half SMR values SMAM stored in the memory circuit 114, and compares the second half SMR values SMB with the corresponding stored first half SMR values SMAM, for each of the 32 frequency bands, so as to select and output a larger one as the vector of SMR values SM of the corresponding frequency band for the whole of one frame.

As seen from the above description of the embodiment, since the FFT circuit 111A is adapted to conduct the 512-point FFT, the required memory capacity of the buffer memory 112A could have been reduced to 512 samples of complex data, namely, a half of the 1024 samples of complex data required in the buffer memory 112 provided in the conventional example. In this connection, the 512-point FFT processing of the above embodiment results in a reduction of resolution as compared with the 1024-point FFT processing of the conventional example, and therefore, lowers the degree of precision in the calculated SMR. Accordingly, deterioration of sound quality may be estimated.

However, since the SMR for the first half of the one frame and the SMR for the second half of the one frame are calculated and the larger one of the two SMRs is selected for each one frame, a "masking effect in time axis" of the "sense of hearing" or "auditory sense" can be utilized so that the deterioration of sound quality can be minimized. Here, the "masking effect in time axis" is defined as the effect that when a large sound is heard, a small sound in proximity-in-time to the large sound is hardly to be heard. Since the first half and the second half of one frame are separated from each other by only an extremely small time difference, the above mentioned "masking effect in time axis" can be effectively utilized. Therefore, a larger one of two SMRs for the first half and the second half of each one frame can be used to be representative of the SMR for the whole of each one frame.

An evaluation of "sense of hearing" was conducted by listening to a reproduced sound obtained by supplying the same audio system with a decoded audio signal obtained by decoding a coded signal obtained by the embodiment of the audio signal processing circuit in accordance with the present invention, and a decoded audio signal obtained by decoding a coded signal obtained by the conventional audio signal processing circuit, respectively. As a result, all of three listeners having an averaged "sense of hearing" could not find any difference.

As seen from the above, the audio signal processing circuit in accordance with the present invention can be reduce the required memory capacity of the buffer memory incorporated therein, and therefore, can reduce the size and cost of the hardware required.

The invention has thus been shown and described with reference to the specific embodiments. However, it should be noted that the present invention is in no way limited to the details of the illustrated structures but changes and modifications may be made within the scope of the appended claims.

I claim:

1. An audio signal processing circuit for providing subband coding for an audio signal coding, the audio signal processing circuit being so configured that each one frame is constituted of a first number of audio samples quantized in a predetermined format, and the audio samples of each one frame are converted into subband signals divided into a second number of frequency bands, said second number being smaller than said first number, and in each subband, a signal level is compared to a mask level indicative of a limit of "sense of hearing", so as to calculate a signal-to-mask ratio (SMR), the audio signal processing circuit comprising:

a subband filter circuit receiving said audio samples, for generating said subband signals divided into said second number of frequency bands;

a fast Fourier transform circuit receiving said audio samples and dividing the received audio samples of each one frame into first and second audio sample groups each including a third number of audio samples, said third number being smaller than said first number, said fast Fourier transform circuit carrying out a fast Fourier transform processing for each of said first and second audio sample groups, group by group, so as to sequentially output a first power spectrum for said first audio sample group, and a second power spectrum for said second audio sample group;

a buffer memory coupled to said fast Fourier transform circuit and used as a buffer in said fast Fourier transform processing carried out in said fast Fourier transform circuit, said buffer memory having a memory capacity corresponding to the data amount of audio samples of said third number;

an SMR calculating circuit receiving said subband signals and said first and second power spectrums, for calculating first and second vectors of SMR values each of which contains SMR signals corresponding to said frequency bands of said second number, respectively;

a comparing circuit for comparing each of the SMR signals included in said first vector of SMR values with a corresponding one of the SMR values included in said second vector of SMR values, for each of said frequency bands of said second number, and for selecting a larger SMR value to output the selected SMR value as an SMR value of the same frequency band for the whole of a corresponding one frame; and a memory circuit for holding said first vector of SMR values until calculation of said second vector of SMR values has been completed.

2. An audio signal processing circuit claimed in claim 1 wherein said first, second and third number are 1152, 32 and 512, respectively.

* * * * *